United States Patent Office 3,481,961
Patented Dec. 2, 1969

3,481,961
PROCESS OF PREPARING COBALT HYDROCARBONYLS
Gianfranco Pregaglia, Milan, and Renato Castelli and Alberto Andreetta, Novara, Italy, assignors to Montecatini Edison S.p.A., Milan, Italy
No Drawing. Filed Feb. 3, 1967, Ser. No. 613,762
Claims priority, application Italy, Feb. 7, 1966, 2,593/66
Int. Cl. C07f *15/06;* C07c *5/14;* B01j *11/22*
U.S. Cl. 260—439                           3 Claims

ABSTRACT OF THE DISCLOSURE

The compounds are of the class of cobalt carbonyls, $HCo(CO)_2(PR_3)_2$ wherein R is alkyl from 1 to 10, useful as hydrogenation catalysts.

---

Our invention relates to cobalt hydrocarbonyls, method of their preparation and their use as hydrogenation catalysts.

The compounds which are the object of the present invention, have the formula:

$$HCo(CO)_2(PR_3)_2 \quad (I)$$

wherein R is an alkyl containing from 1 to 10 carbon atoms.

The literature shows the use of several cobalt-carbonyls, containing phosphines, as catalysts. For example, French Patent 1,345,933 describes a hydroformylation process of olefins wherein cobalt-tricarbonyl-tributyl-phosphine having the formula $[Co(CO)_3(PBu_3)]_2$ is used as the catalyst. The preparation and the use of this compound are also described in the Dutch patent application No. 6,400,701.

We have found that cobalt hydrocarbonyls of the general Formula I, which we have prepared, are active hydrogenation catalysts. These new compounds can be used in hydrocarbon (aliphatic, cycloaliphatic, aromatic) solution or in the solution of the substances themselves to be reduced. The catalysts easily hydrogenate, in homogeneous phase, the saturated and unsaturated aldehydes, ketones, alkenes, alkynes, etc.

The compounds of the present invention can be obtained by one of the following methods:

(a) Reaction in hydrocarbon solution at 50–200° C. under hydrogen pressure (20–30 atm.) of a cobalt carbonyl having the formula $[Co(CO)_3(PR_3)]_2$ with a trialkyl-phosphine, in the presence of an aliphatic alpha-olefin. The alpha-olefin favors the extraction of a carbonyl group from the starting complex.

(b) Simple heating at 140–180° C., under hydrogen pressure, of a hydrocarbon solution of $[Co(CO)_3(PR_3)]_2$ and trialkyl-phosphine in an amount sufficient so that the substitution of a CO group for each cobalt atom takes place.

(c) Direct synthesis from a $Co^{++}$ soluble salt with an organic acid (e.g. cobalt 2-ethylhexanoate), trialkyl-phosphine and carbon oxide in molar ratio $$Co:CO:PR_3 = 1:2:2$$

in hydrocarbon solution at 100–180° C. under hydrogen pressure.

The solutions obtained according to any of the above-mentioned methods are clear and vary in color between yellow-brown and red-brown. The I.R. spectra, determined by Perkin-Elmer spectrometer, type 21, using a NaCl cell of 0.05 mm., show bands at 5.05–5.08, 5.11–5.14 and 5.26–5.29 microns.

The following examples are not intended to limit the invention, describe the methods of preparation of the catalyst and some applications as a catalyst for the hydrogenation of organic compounds.

EXAMPLE 1

A 200 c.c shaking stainless steel autoclave provided with manometer, is carefully swept by pure nitrogen. 2.31 g. of dicobalt-octacarbonyl (6.75 mM.) dissolved in 100 cc. of n-heptane and 3.6 g. of freshly rectified triethylphosphine (30.5 mM.) are then introduced. The autoclave and contents (whole) are agitated at room temperature for 30 minutes during which time the following reaction takes place:

$$Co_2(CO)_8 + 2PEt_3 \rightarrow [Co(CO)_3(PEt_3)_2]^+[Co(CO)_4]^- + CO$$

At the end of reaction, the gases are discharged in order to remove the carbon oxide produced. The whole is then heated under agitation at 70° C. for 30 minutes, in order to transform the salt $$[Co(CO)_3(PEt_3)_2][Co(CO)_4]$$

into the covalent compound $[Co(CO)_3(PEt_3)_2]$.

Then 25 atm. of hydrogen are introduced and the whole is heated at 155° C. for 60 minutes, at the end thereof the whole is cooled and the gases are discharged. This heating operation under hydrogen pressure is repeated nine times, thus obtaining a clear solution of an orange shade, which at the I.R. spectrum, shows bands at 5.07, 5.11 and 5.26 microns characteristic of the $HCo(CO)_2(PR_3)_2$ compounds.

EXAMPLE 2

This example is carried out in the same manner and with the same amounts of reagents described in the preceding example using tri-n-hexyl-phosphine instead of tri-ethyl-phosphine. At the end of the reaction, a clear solution of red-brown color, which at I.R., shows bands at 5.06, 5.13 and 5.28 microns, characteristic of the $$HCo(CO)_2(PR_3)_2$$

compounds, is obtained.

EXAMPLE 3

11.6 mM. of $HCo(CO)_2(PEt_3)_2$, contained in 130 cc. of heptane solution, are introduced in the 200 cc. autoclave together with 7.9 g. (136 mM.) of pure acetone. 90 atm. of hydrogen are compressed at room temperature and the whole is heated at 155° C. The adsorption of hydrogen begins at 145° C. The reaction is continued for 6 hours and 20 minutes at 155° C. and 100 atm. Upon completion, a clear orange solution, which at the gas chromatography, is seen to contain 115 mM. of isopropyl alcohol and 19.5 mM. of acetone, is obtained.

EXAMPLE 4

Into the 200 cc. shaking autoclave, carefully washed with nitrogen, 140 cc. of a heptane solution containing 11.8 mM. of $HCo(CO)_2(PEt_3)_2$ and 8.12 g. (140 mM.) of pure acetone are introduced. 90 atm. of hydrogen are compressed at room temperature and the autoclave and contents are heated at 160° C. The hydrogen adsorption begins at 147° C. and the reaction is carried out at 110 atm. and at 160° C. After 9 hours and 50 minutes the adsorption ends. A clear red-brown solution, which by gas-chromatography analysis, is seen to contain 110 mM. of isopropyl alcohol and 26 mM. of acetone, is discharged.

EXAMPLE 5

Into the 200 cc. stainless steel shaking autoclave provided with manometer and carefully washed with pure nitrogen, a homogeneous solution consisting of—

| | | |
|---|---|---|
| $[Co(CO)_3PBu_3]_2$ (6.67 mM.) | g | 4.60 |
| n-Heptane | cc | 95 |
| Octene-1 (126 mM.) | g | 14.1 |
| $P(n-C_4H_9)_3$ (16.8 mM.) | g | 3.39 | is sucked in. 25 atm. of hydrogen are then introduced and the autoclave and contents are heated at 119° C. maintaining the pressure during the adsorption between 35 and 30 atm. Within 10½ hours a total decrease of 53.5 atm. takes place. The clear brown solution obtained shows I.R. bands at 5.06, 5.13 and 5.28 microns.

When the reaction is carried out as described above, but in the absence of free phosphine, a clear red solution, which at the I.R. shows a single strong band at 5.13 with a shoulder at 5.07, characteristic of the starting catalyst $[Co(CO)_3PBu_3]_2$ is obtained.

EXAMPLE 6

Working as in Example 5, the following are introduced into the autoclave:

| | | |
|---|---|---|
| $[Co(CO)_3PBu_3]_2$ (6.77 mM.) | g | 4.67 |
| n-Heptane | cc | 95 |
| $P(n-C_4H_9)_3$ (16.8 mM.) | g | 3.39 |

25 atm. of hydrogen are then introduced. The whole is heated up to 160° C. and maintained at this temperature for one hour. The autoclave is then cooled and the gases vented. This operation is repeated for ten additional repetitions. Thus a clear brown solution is obtained. This solution shows I.R. bands at 5.06, 5.13 and 5.28 microns as the solution obtained according to Example 5.

By concentration of the solutions obtained in the Examples 5 and 6 to remove all traces of volatile substances, an oily, brown-red liquid is obtained which gives the following analysis.

Found: Co=10.9%, C=60.26%, H=10.6%, CO= 10.35%. Theoretical for Co:2CO:2PBu$_3$: Co=11.37%, C=60.20%, H=10.41%, CO=10.79%.

The I.R. spectrum of the oily compound (thickness less than 0.01 mm.) shows bands at 5.08, 5.14 and 5.27 microns, corresponding to those of the compound in solution prepared according to the above-described methods.

The NMR spectrum carried out in an apparatus at 60 mc. shows a triplet (J=45 c./s.) at 11.25 p.p.m. at higher fields from $Si(CH_3)_4$, which position is characteristic for the hydrides.

By heating of the oily compound (11.5 mM.) in heptane solution (62 g.) under 15 atm. of CO, for 4 hours at 160° C., the yellow-brown solution turns blood-red. In the gases produced, the hydrogen (5 mM. H$_2$) developed, corresponding to 87% of the hydrogen of the hydride, is found.

The I.R. spectrum of the solution shows strong bands of cobalt-tricarbonyl-phosphine and only very weak bands of cobalt-dicarbonyl-hydride.

This confirms the structure:

$HCo(CO)_2[P(n-C_4H_9)_3]_2$ for the compound under examination.

EXAMPLE 7

In the 200 cc. autoclave a solution containing:

| | | |
|---|---|---|
| Cobalt (II) 2-ethylhexanoate (13.5 mM.) | g | 4.66 |
| n-Heptane | cc | 95 |
| $P(n-C_4H_9)_3$ (27 mM.) | g | 5.45 | is introduced.

After heating at 160° C., 605 N cm.³ (27 mM.) of carbon monoxide and 40 atmospheres of pure hydrogen are introduced. Rapid adsorption, which practically goes to completion within 15 minutes takes place. The clear brown solution thus obtained shows I.R. bands at 5.06, 5.13 and 5.28 microns.

EXAMPLE 8

In the 200 cc. autoclave an amount of the solution of the cobalt complex, obtained according to Example 2, containing 10.96 milliatoms of cobalt, is introduced.

Then 9.9 g. (137.5 mM.) of freshly distilled n-butyraldehyde and 25 atmospheres of hydrogen are added. The autoclave and contents are heated at 160° C. carrying out the reaction between 35 and 30 atmospheres of pressure. The adsorption begins at 135° C. and ends practically within 40 minutes, while the temperature raises progressively up to 160° C. The reaction solution, clear and brown-colored, contains 122.5 mM. of n-butyl alcohol, 1.4 mM. of n-butyraldehyde and 11 mM. of 2-ethylhexyl alcohol.

EXAMPLE 9

11.6 mM. of $HCo(CO)_2$ $(PBu_3)_2$ contained in 100 cc. of heptane solution, are introduced in the 200 cc. autoclave together with 7.78 g. (134 mM.) of freshly distilled pure acetone.

80 atmospheres of hydrogen are introduced and the whole is heated at 160° C., carrying out the reaction between 110 and 100 atmospheres. The solution discharged is clear and shows the same color of the starting solution. Gas chromatography shows the solution to contain 132 mM. of isopropyl alcohol and 1.2 mM. of acetone.

When the reaction is carried out under the same conditions, but at lower H$_2$ pressure (35–30 atmospheres), a reaction product containing 123 mM. of isopropyl alcohol and 11 mM. of acetone is obtained.

EXAMPLE 10

In the 200 cc. autoclave, 100 cc. of a heptane solution, prepared according to Example 3, containing 11.3 milliatoms of cobalt and 2.9 g. (26.4 mM.) of actyne-1 are introduced. 21 atmospheres of hydrogen are introduced and the whole is heated at 75° C. At this temperature the adsorption begins, which is completed within 15 minutes. The clear brown solution obtained from the reaction contains 19.8 mM. of octene-1 and 5.28 mM. of octane.

When the reaction is carried out under the same conditions, but at 160° C., the octyne is quantitatively reduced to octane.

EXAMPLE 11

In the 200 cc. autoclave, 100 cc. of a heptane solution of the catalyst prepared according to Example 1, containing 11.7 milliatoms of cobalt, are introduced. After having introduced 10.2 g. (243 mM.) of propylene, the whole (autoclave and contents) is heated up to 120° C. and 35 atmospheres of hydrogen are introduced. A quick adsorption of the hydrogen occurs immediately and ends within 23 minutes. Upon completion of the reaction, the gases recovered and the solution show 233 mM. of propane by gas-chromatography.

EXAMPLE 12

In the 200 cc. autoclave, 100 cc. of heptane solution of the catalyst prepared according to Example 1, containing 11.7 milliatoms of cobalt are introduced. After introduction of 16.6 g. (132 mM.) of freshly distilled 2-ethyl-hexenal, 75 atmospheres of hydrogen are compressed and the whole is heated up to 104° C. At this temperature, the hydrogen adsorption begins and ends within 90 minutes, while the pressure is kept between 90 and 100 atmospheres. The extracted solution is clear, brown-violet colored, and shows the same I.R. band as the starting catalytic solution, while containing 132 mM. of ethyl-hexyl alcohol.

We claim:
1. The process for preparing cobalt hydrocarbonyls of the formula

$$HCo(CO)_2(PR_3)_2$$

wherein R is an alkyl containing from 1 to 10 C which comprises reacting a cobalt-carbonyl having the formula $[Co(CO)_3PR_3]_2$, in hydrocarbon solution at 140–180° C. under hydrogen pressure, with an excess of trialkylphosphine $PR_3$ wherein R is an alkyl having from 1 to 10 C.

2. The process for preparing cobalt hydrocarbonyls of the formula $$HCo(CO)_2(PR_3)_2$$

wherein R is an alkyl containing from 1 to 10 C which comprises reacting a soluble salt of $Co^{++}$ and an organic acid in hydrocarbon solution at 100–180° C., under hydrogen pressure, with a trialkylphosphine $PR_3$, wherein R is an alkyl having from 1 to 10 C and carbon monoxide, with a molar ratio $Co:CO:PR_3$ substantially equal to 1:2:2.

3. The process for preparing cobalt hydrocarbonyls of the formula $$HCo(CO)_2(PR_3)_2$$

wherein R is an alkyl containing from 1 to 10 C, which comprises reacting cobalt-carbonyl of the formula $[Co(CO)_3PR_3]_2$, wherein R is an alkyl containing from 1 to 10 C in hydrocarbon solution at 50–200° C., under hydrogen pressure of from 20 to 30 atmospheres, with a trialkylphosphine $PR_3$ wherein R in an alkyl containing from 1 to 10 carbon atoms, in the presence of an aliphatic alpha-olefin.

References Cited

Heber et al.: Chem. Ber. 98 (1965) pp. 2933–6 and 2938.

Booth: Advances in Inorganic Chemistry and Radiochemistry, vol. 6 (1964), Academic Press, New York, N.Y., p. 22.

TOBIAS E. LEVOW, Primary Examiner

A. P. DEMERS, Assistant Examiner

U.S. Cl. X.R.

252—431; 260—638, 683.9